(12) United States Patent
Nesbitt et al.

(10) Patent No.: US 6,277,034 B1
(45) Date of Patent: Aug. 21, 2001

(54) THREE PIECE GOLF BALL WITH A SPHERICAL METAL CENTER

(75) Inventors: R. Dennis Nesbitt, Westfield; Mark L. Binette, Ludlow, both of MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/394,829

(22) Filed: Sep. 13, 1999

Related U.S. Application Data

(63) Continuation-in-part of application No. 08/870,585, filed on Jun. 6, 1997, and a continuation-in-part of application No. 08/840,392, filed on Apr. 29, 1997, now Pat. No. 5,779,562, which is a continuation-in-part of application No. 08/631,613, filed on Apr. 10, 1996, now Pat. No. 5,803,831, which is a continuation-in-part of application No. 08/591,046, filed on Jan. 25, 1996, now abandoned, which is a continuation of application No. 08/556,237, filed on Nov. 9, 1995, now abandoned, and a continuation-in-part of application No. 08/542,793, filed on Oct. 13, 1995, now abandoned, which is a continuation-in-part of application No. 08/070,510, filed on Jun. 1, 1993, now abandoned.

(51) Int. Cl.$^7$ ............................ A63B 37/06; A63B 37/04; A63B 37/12
(52) U.S. Cl. ............................ 473/372; 473/378; 473/359
(58) Field of Search ..................... 473/359, 384, 473/385, 372, 378

(56) References Cited

U.S. PATENT DOCUMENTS

| | | | |
|---|---|---|---|
| 1,946,378 | * | 2/1934 | Young .................................. 473/359 |
| 2,914,328 | * | 11/1959 | Harkins ................................ 473/359 |
| 3,572,721 | | 3/1971 | Harrison et al. . |
| 4,431,193 | | 2/1984 | Nesbitt . |
| 4,625,964 | | 12/1986 | Yamada . |
| 4,650,193 | | 3/1987 | Molitor et al. . |
| 4,674,751 | | 6/1987 | Molitor et al. . |
| 4,714,253 | | 12/1987 | Nakahara et al. . |
| 4,781,383 | | 11/1988 | Kamada et al. . |
| 4,848,770 | | 7/1989 | Shama . |
| 4,858,924 | | 8/1989 | Saito et al. . |
| 4,863,167 | | 9/1989 | Matsuki et al. . |
| 4,886,275 | | 12/1989 | Walker . |
| 4,911,451 | | 3/1990 | Sullivan et al. . |
| 4,919,434 | | 4/1990 | Saito . |
| 4,986,545 | | 1/1991 | Sullivan . |
| 4,995,613 | | 2/1991 | Walker . |
| 4,998,734 | | 3/1991 | Meyer . |
| 5,002,281 | | 3/1991 | Nakahara et al. . |
| 5,048,838 | | 9/1991 | Chikaraishi et al. . |
| 5,072,944 | | 12/1991 | Nakahara et al. . |
| 5,098,105 | | 3/1992 | Sullivan . |
| 5,104,126 | | 4/1992 | Gentiluomo . |
| 5,120,791 | | 6/1992 | Sullivan . |
| 5,184,828 | | 2/1993 | Kim et al. . |
| 5,187,013 | | 2/1993 | Sullivan . |
| 5,273,286 | | 12/1993 | Sun . |
| 5,334,673 | | 8/1994 | Wu . |
| 5,368,304 | | 11/1994 | Sullivan et al. . |
| 5,480,155 | | 1/1996 | Molitor et al. . |
| 5,482,285 | | 1/1996 | Yabuki et al. . |
| 5,490,674 | | 2/1996 | Hamada et al. . |
| 5,688,191 | | 11/1997 | Cavallaro et al. . |
| 5,713,802 | | 2/1998 | Moriyama et al. . |
| 5,779,561 | | 7/1998 | Sullivan et al. . |
| 5,780,169 | | 7/1998 | Hiraoka et al. . |
| 5,899,822 | | 5/1999 | Yamagishi et al. . |
| 6,110,058 | * | 8/2000 | Bennett .................................. 473/359 |

FOREIGN PATENT DOCUMENTS 2 317 897    4/1998    (GB) .

\* cited by examiner

*Primary Examiner*—Mark S. Graham
*Assistant Examiner*—Raeann Gordon

(57) ABSTRACT

A golf ball utilizing a high density core component, which is preferably part of a multicomponent core assembly is disclosed. The high density core component is preferably in the form of a metal sphere. The golf balls exhibit a unique combination of a relatively high coefficient of restitution, a controlled moment of inertia, and a relatively high spin rate during short distance shots. It is preferred that the high density core component be utilized in conjunction with a multi-layer cover assembly.

18 Claims, 4 Drawing Sheets

THREE PIECE GOLF BALL WITH A SPHERICAL METAL CENTER

CROSS REFERENCES TO RELATED APPLICATIONS

This application is a continuation-in-part application of U.S. patent application Ser. No. 08/870,585, filed Jun. 6, 1997, which is a continuation of U.S. patent application Ser. No. 08/556,237, filed Nov. 9, 1995, which is a continuation-in-part of U.S. patent application Ser. No. 08/070,510 filed Jun. 1, 1993. This application is also a continuation-in-part application of U.S. patent application Ser. No. 08/840,392, filed Apr. 29, 1997, now issued as U.S. Pat. No. 5,779,562, which is a continuation-in-part of U.S. patent application Ser. No. 08/631,613, filed Apr. 10, 1996, which in turn is a continuation-in-part of U.S. patent application Ser. No. 08/591,046, filed on Jan. 25, 1996, and U.S. patent application Ser. No. 08/542,793, filed on Oct. 13, 1995, which in turn is a continuation-in-part of U.S. patent application Ser. No. 08/070,510, filed on Jun. 1, 1993.

FIELD OF THE INVENTION

The present invention relates to a golf ball utilizing a spherical metal core component. The metal core is preferably disposed within a solid polybutadiene core assembly. The present invention golf ball exhibits high initial spin, high launch angle, high ball speed and a low moment of rotational inertia.

BACKGROUND OF THE INVENTION

Golf balls traditionally have been categorized in three different groups, namely, as one piece balls, two piece solid balls, and wound balls.

The one piece ball typically is formed from a solid mass of moldable material which has been cured to develop the necessary degree of hardness. It possesses no significant difference in composition between the interior and exterior of the ball. These balls do not have an enclosing cover. One piece balls are described, for example, in U.S. Pat. No. 3,313,545; U.S. Pat. No. 3,373,123; and U.S. Pat. No. 3,384,612.

The wound ball is made with a vulcanized rubber thread wound under tension around a solid or semi-solid core and thereafter enclosed in a single or multilayer covering of tough protective material. While for many years the wound ball satisfied the standards of both the U.S.G.A. and most golfers, it has several disadvantages. For example, a wound ball is difficult to manufacture due to the number of production steps required and the careful control which must be exercised in each stage of manufacture to achieve suitable roundness, velocity, rebound, "click", "feel", and the like.

Conventional multi-piece solid golf balls, on the other hand, include a solid resilient core having single or multiple cover layers employing different types of material molded on the core. The one piece golf ball and the solid core for a multi-piece solid (nonwound) ball frequently are formed from a combination of materials such as polybutadiene and other rubbers cross linked with zinc diacrylate or zinc dimethacrylate, and containing fillers and curing agents which are molded under high pressure and temperature to provide a ball of suitable hardness and resilience. For multi-piece nonwound golf balls, the cover typically contains a substantial quantity of ionomeric resins that impart toughness and cut resistance to the covers.

A number of multi-piece solid balls have been produced to address various needs of the industry. The different types of materials used to formulate the cores, covers, etc. of these balls dramatically alter the balls' overall characteristics. Various structures have been suggested using multi-layer cores and single layer covers wherein the core layers have different physical characteristics. For example, U.S. Pat. Nos. 4,714,253; 4,863,167; and 5,184,828 relate to three piece solid golf balls having improved rebound characteristics in order to increase flight distance. The '253 patent is directed towards differences in the hardness of the different layers. The '167 patent relates to a golf ball having a center portion and an outer layer containing a gravity filler such as tungsten or tungsten carbide so as to impart a higher specific gravity to the outer layer than that of the inner layer. Preferably, the outer layer is harder than the center portion. The '828 patent suggests that the maximum hardness must be located at the interface between the core and the mantle, and the hardness must then decrease both inwardly and outwardly.

A number of patents suggest improving the spin and feel by manipulating the core construction. For example, U.S. Pat. No. 4,625,964 relates to a solid golf ball having a core diameter not more than 32 mm and an outer layer having a specific gravity less than that of the core. In U.S. Pat. No. 4,650,193, it is suggested that a curable core elastomer be treated with a cure altering agent to soften an outer layer of the core. U.S. Pat. No. 5,002,281 is directed towards a three piece solid golf ball which has an inner core having a gravity greater than 1.0 but less than or equal to that of the outer shell which must be less than 1.3. U.S. Pat. Nos. 4,848,707 and 5,072,944 disclose three-piece solid golf balls having center and outer layers of different hardness. Other examples of such dual layer cores can be found in the following patents: U.S. Pat. No. 4,781,383; U.S. Pat. No. 4,858,924; U.S. Pat. No. 5,002,281; U.S. Pat. No. 5,048,838; U.S. Pat. No. 5,104,126; U.S. Pat. No. 5,273,286; U.S. Pat. No. 5,482,285; and U.S. Pat. No. 5,490,674.

Most professional golfers and good amateur golfers desire a golf ball that provides distance when hit off a driver, control and stopping ability on full iron shots, and high spin for short "touch and feel" shots. Many conventional two piece and thread wound performance golf balls have undesirable high spin rates on full shots. The excessive spin on full shots is a sacrifice made in order to achieve more spin on the shorter touch shots.

The multi-piece nonwound balls typically provide low deformation upon impact and a small contact area between the ball and the club face. This provides a greater degree of slipperiness on the club face and, therefore, less control over the ball and greater difficulty in stopping the ball on the green when using short irons. At least some of these deficiencies are considered to result also from a large moment of inertia exhibited by the multi piece balls. It would be useful to develop a ball with a controlled moment of inertia in order to provide the desired backspin when using short irons, but at the same time without adversely impacting the desired flight and roll distance of the ball when using a driver.

Prior artisans have attempted to incorporate spherical metal components in golf balls. For instance, U.S. Pat. No. 5,104,126 attempts to concentrate the weight of the golf ball in the center core region by utilizing a metal ball as the core component. However, that golf ball utilizes a single cover layer construction and admittedly conventional materials and structure. Various patents have been issued directed to game balls and practice balls containing metal centers, for instance U.S. Pat. Nos. 4,886,275 and 4,995,613. And, a rather old and dated patent to Harkins describes a golf ball containing a steel sphere. None of these patents however are capable of satisfying the needs and requirements of the current golf industry. Accordingly, there is a need for an improved golf ball, utilizing present state-of-the-art materials, configuration, and construction techniques.

SUMMARY OF THE INVENTION

In the first aspect, the present invention provides a golf ball comprising a spherical metal core component, a core layer disposed about the metal core component, and a cover layer assembly generally enclosing the core layer. The core component and core layer, and resulting assembly exhibit specific characteristics as follows. The spherical metal core component has a specific gravity of from about 1.5 to about 19.4. The core layer has a specific gravity less than 1.2. The resulting combination of the metal core component and the core layer form a core assembly which exhibits a coefficient of restitution of at least 0.730.

In another aspect, the present invention provides a golf ball comprising a spherical metal core component and a core layer concentrically disposed about and immediately adjacent to the metal core component. The core layer comprises polybutadiene. The resulting dual core assembly exhibits a coefficient of restitution of at least about 0.780.

In yet another aspect, the present invention provides a golf ball having a dimpled outer surface and exhibiting improved playability properties. The golf ball comprises a spherical metal core component having a specific gravity of at least about 1.5. The golf ball further comprises a core layer disposed about the metal core component which has a specific gravity less than the specific gravity of the core component. And, the golf ball further comprises a multi-layer cover assembly disposed about the core layer in which includes an inner cover layer disposed proximate to the core layer, and an outer cover layer disposed immediately adjacent to the inner cover layer.

The invention accordingly consists in the features of construction, combination of elements and arrangement of parts which will be exemplified in the construction hereinafter set forth.

DETAILED DESCRIPTION OF THE PREFERRED EMBODIMENTS

The present invention relates to improved multi-layer nonwound golf balls, and particularly to solid golf balls comprising a multi-layered solid core assembly encased within a cover, preferably a multi-layer cover assembly, and a method for making same. The golf balls of the invention, which can be of a standard or enlarged size, have a unique combination of high coefficient of restitution, a controlled moment of inertia, and a high spin rate on short shots.

The core of the preferred embodiment golf ball can be formed of an inner or central core component and a solid outer core layer having not only the desired coefficient of restitution (COR), compression and hardness, but a significantly different specific gravity relative to the central core component. As described in greater detail herein, the central core component is preferably in the form of a spherical metal core center. For balls having a low moment of inertia, the central core component preferably has a higher specific gravity than the outer core layer.

The multi-layered cover preferably comprises at least two layers: a first or inner cover layer and a softer second or outer cover layer. The cover layers can be ionomer, ionomer blends, non-ionomer, non-ionomer blends, or blends of ionomer or non-ionomer. These aspects are all described in greater detail herein.

The preferred embodiment golf balls of the present invention may also, if desired, include one or more interior mantle layers. The one or more mantle layers are preferably disposed between the core and cover components of the ball. The details of the optional mantle layer are provided herein.

The present invention is based, at least in part, upon the discovery that, concentrating the weight in the middle of the golf ball, which in one preferred embodiment described herein is accomplished by centrally disposing a metal ball or sphere within the interior of the core assembly, decreases the moment of inertia and mimics the spin characteristics of a wound golf ball.

Moment of Inertia, sometimes designated "MOI" herein, for the golf balls of the present invention is the sum of the products formed by multiplying the mass of each element by the square of its distance from a specified line or point. This is also known as rotational inertia. Since the present invention golf balls comprise a number of components, the MOI of the resulting golf ball is equal to the sum of the moments of inertia of each of its various components, taken about the same axis or point. All of the moments of inertia of golf balls referred to herein are with respect to, or are taken with regard to, the geometric center of the golf ball.

Figure 1:
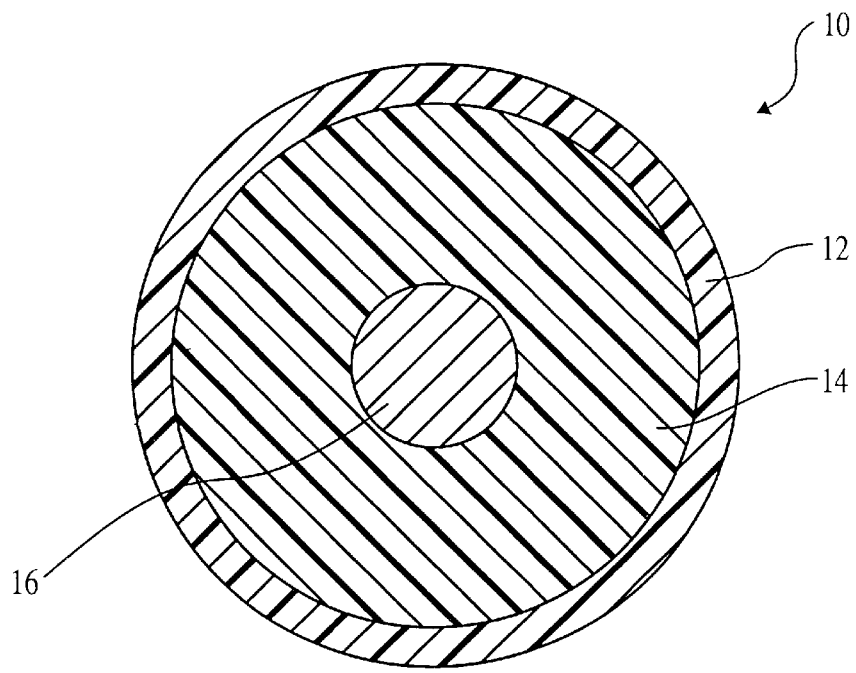
FIG. 1 is a schematic cross section illustrating a first preferred embodiment golf ball according to the present invention.

FIG. 1 illustrates a first preferred embodiment golf ball according to the present invention. The first preferred embodiment golf ball 10 comprises a spherical metal core 16, an interior mantle layer 14 disposed about the core 16, and an outer cover layer 12. It will be understood that the referenced drawings are schematic in nature and not necessarily to scale.

Figure 2:
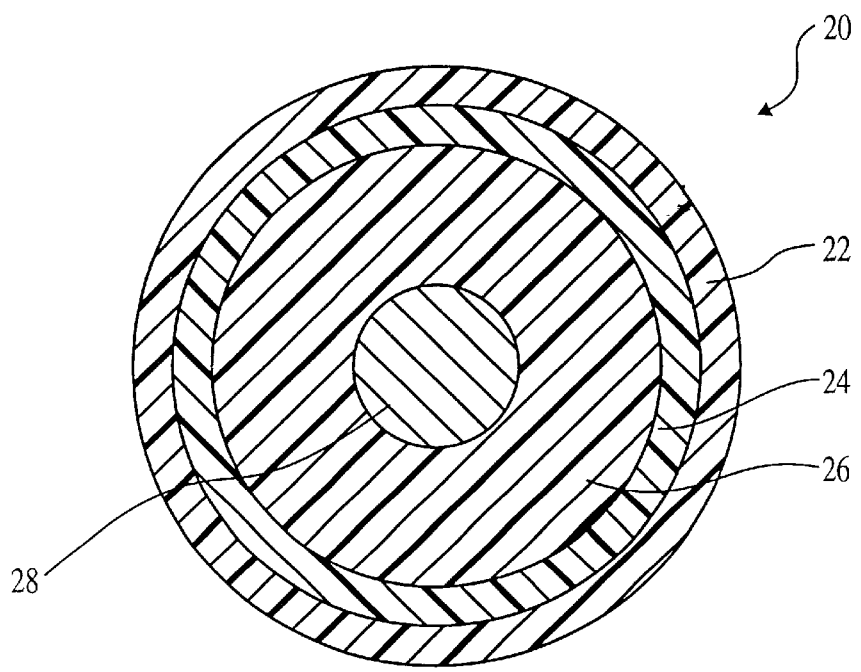
FIG. 2 is a schematic cross section illustrating a second preferred embodiment golf ball according to the present invention.

FIG. 2 illustrates a second preferred embodiment golf ball in accordance with the present invention. The second preferred embodiment ball comprises a spherical metal core 28, an interior mantle layer 26 generally surrounding and disposed about the core 28, an inner cover layer 24 disposed about the mantle layer 26, and an outer cover layer 22 generally surrounding and enclosing the inner cover layer 24.

Figure 3:
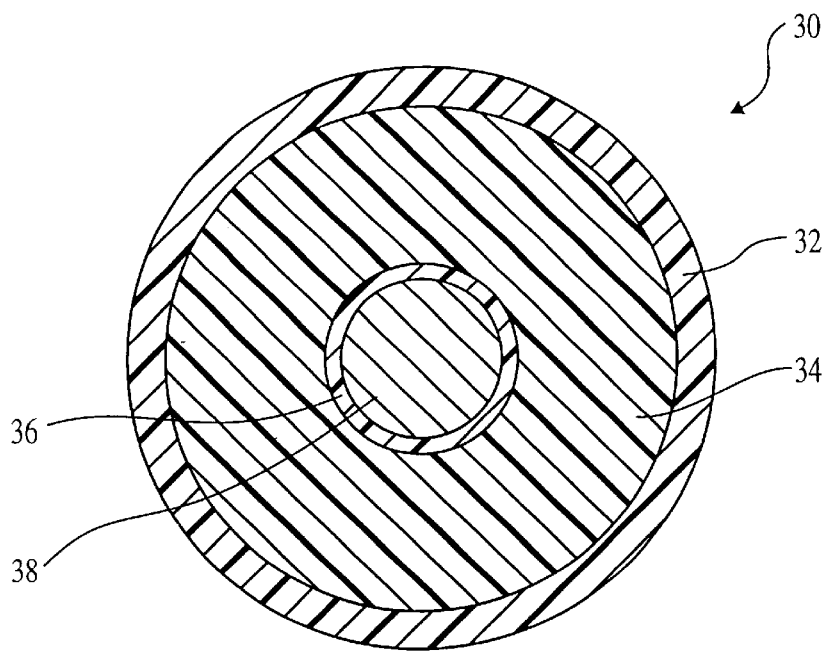
FIG. 3 is a schematic cross section illustrating a third preferred embodiment golf ball according to the present invention.

FIG. 3 illustrates a third preferred embodiment golf ball 30 in accordance with the present invention. The golf ball 30 comprises a spherical metal center 38, a core layer 36 surrounding the metal center 38, an interior mantle layer 34 disposed about the core layer 36, and an outer cover layer 32.

Figure 4:
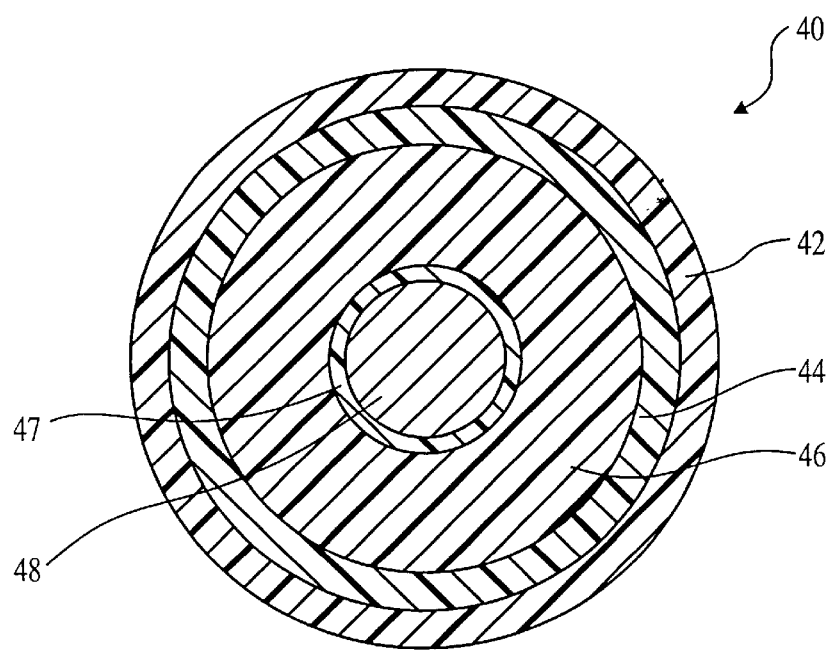
FIG. 4 is a schematic cross section illustrating a fourth preferred embodiment golf ball according to the present invention.

FIG. 4 illustrates a fourth preferred embodiment golf ball 40 in accordance with the present invention. The golf ball 40 comprises a spherical metal core 48, a core layer 47 disposed about the core 48, an interior mantle layer 46 disposed about the core layer 47, an inner cover layer 44 generally disposed about the mantle layer 46, and an outer cover layer 42 surrounding the inner cover layer 44.

Details of these components are described in greater detail below.

Core

The center core component of the present invention golf ball comprises a high density core component, and one or more optional core layers disposed about the core component. High density core components are preferably metals, and most preferably steel, titanium, tungsten, brass and lead. Other examples of preferred metals include molybdenum, copper, nickel, iron, and combinations of these with other metals. A wide array of steels may be utilized including for example, chrome steel, stainless steel, carbon steel, and combinations thereof. The center core component preferably is of a generally homogenous construction.

The center core component is preferably spherical in shape. The center core component is also preferably concentrically disposed within the interior of the golf ball. As exemplified in the referenced drawings, the center core component is preferably surrounded by, and most preferably enclosed by, one or more core layers.

The core layers may include a wide array of materials, preferably rubber based materials such as cis-1,4 polybutadiene and mixtures of polybutadiene with other elastomers blended together with cross linking agents, a free radical initiator, specific gravity controlling fillers and the like. It is preferred that the core layer include at least 50% by weight polybutadiene. Natural rubber, isoprene rubber, EPR, EPDM, styrene-butadiene rubber, or similar thermoset materials may be appropriately incorporated into the base rubber composed of the butadiene rubber to form the rubber component. For core configurations utilizing two core layers enclosing a high density core component, it is preferred to use butadiene rubber as a base material of the composition for both the inner core layer and the outer core layer. Thus, the same rubber composition, including the rubber base, cross linking agent, free radical initiator, and modifying ingredients, except for the specific gravity controlling filler, can be used in the one or more core layers. However, different compositions can readily be used in different core layers, including thermoplastic materials such as a thermoplastic elastomer or a thermoplastic rubber, or a thermoset rubber or thermoset elastomer material. Some examples of materials suitable for use as a core layer include polyether or polyester thermoplastic urethanes as well as thermoset polyurethanes or metallocene polymers or blends thereof. For example, suitable metallocene polymers include foams of thermoplastic elastomers based on metallocene single site catalyst based foams. Such metallocene based foam resins are commercially available. Examples of thermoset materials include a rubber based, castable urethane or a silicone rubber. The silicone elastomer may be any thermoset or thermoplastic polymer comprising, at least partially, a silicone backbone. Preferably, the polymer is a thermoset and is produced by intermolecular condensation of silanols. A typical example is a polydimethylsiloxane cross linked by free radical initiators, or by the cross linking of vinyl or allyl groups attached to the silicone through reaction with silyhydride groups, or via reactive end groups. The silicone may include a reinforcing or non-reinforcing filler. Additionally, the present invention also contemplates the use of a polymeric foam material, such as the metallocene based foamed resin.

It is preferred that the base rubber or elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized.

The cross linking agent of the core composition is the reaction product of an unsaturated carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are the α- or β-ethylenic unsaturated acids such as acrylic acid, methacrylic acid, itaconic acid, crotonic acid, sorbic acid, and the like, and mixtures thereof. Preferably, the acid component is either acrylic or methacrylic acid. Usually, from about 15 to about 30, and preferably from about 17 to about 23 parts by weight of the carboxylic acid salt, such as zinc diacrylate, is included in the core composition. The unsaturated carboxylic acids and metal salts thereof are generally soluble in the elastomeric base, or are readily dispersible.

The free radical initiator included in the core composition is any known polymerization initiator which decomposes during the cure cycle. The term "free radical initiator" as used herein refers to a chemical which, when added to a mixture of the elastomeric blend and a metal salt of an unsaturated, carboxylic acid, promotes a cross linking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides, which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed. Commercially available peroxides include n-butyl 4,4-bis (butylperoxy) valerate having a one hour half life at about 112° C., and 1,2-bis(t-butylperoxy-3,3,5-trimethyl cyclohexane having a one hour half life at about 129° C.

The core layer compositions of the present invention may additionally contain any other suitable and compatible modifying ingredients including, but not limited to, metal oxides, fatty acids, and diisocyanates and polypropylene powder resins. For example, a polymeric diisocyanate is used as an optional component in the rubber compositions. It can range from about 0 to 5 parts by weight per 100 parts by weight rubber (phr) component, and acts as a moisture scavenger. In addition, it has been found that the addition of a polypropylene powder resin allows for a reduction in the amount of cross linking agent utilized to form the core to a normal or below normal compression.

Furthermore, because polypropylene powder resin can be added to the core layer compositions without an increase in weight of the molded core upon curing, the addition of the polypropylene powder allows for the addition of higher specific gravity fillers, such as mineral fillers. Since the cross linking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene ($C_3H_5$) powder suitable for use in the present invention has a specific gravity of about 0.90 g/cm$^3$, a melt flow rate of about 4 to about 12, and a particle size distribution of greater than 99% through a 20 mesh screen. From 0 to about 25 parts by weight polypropylene powder per each 100 parts of elastomer may be utilized in the present invention.

Various activators may also be included in the core compositions of the present invention. For example, zinc oxide and/or magnesium oxide are activators for the polybutadiene. The activator can range from about 2 to about 30 parts by weight per 100 parts by weight of the rubber (phr) component.

Moreover, filler-reinforcement agents may be added to the core layer compositions of the present invention. Since the specific gravity of polypropylene powder is very low, and when compounded, the polypropylene powder produces a light molded core. When polypropylene is incorporated in the core layer compositions, relatively large amounts of higher specific gravity fillers may be added so long as the specific core weight limitations are met. Additional benefits may be obtained by the incorporation of relatively large amounts of higher specific gravity, inexpensive mineral fillers such as calcium carbonate, tungsten, tungsten carbide, barium sulfate, and zinc sulfate. However, the filler is not limited to these substances. Such fillers as are incorporated into the core layer compositions should be in finely divided form, as for example, in a size generally less than about 30 mesh and preferably less than about 100 mesh U.S. standard size. The amount of additional filler included in the core layer compositions is primarily dictated by weight restrictions and preferably is included in amounts of from about 3 to about 300 parts by weight and more preferably in amounts from about 20 to about 200 parts by weight per 100 parts rubber.

In the preferred low moment of inertia ball, the specific gravities of the core materials increase toward the center of the ball. In other words, the specific gravity of the center core is greater than the specific gravity of the outer core layer. More particularly, the typical single core has a specific gravity of about 1.2. However, according to the present invention, the center core component has a specific gravity between about 1.5 to 19.4 and one or more core layers have a specific gravity of less than about 1.2. Where a higher moment of inertia is desirable, the specific gravity of the center core is reduced below 1.2 and that of the core layers is increased. Further, description of the specific gravity of the various core layers is provided herein.

The preferred fillers are relatively inexpensive and heavy and serve to lower the cost of the ball and to increase the weight of the ball to closely approach the U.S.G.A. weight limit of 1.620 ounces. However, if thicker cover compositions are to be applied to the core to produce larger than normal (i.e. greater than 1.680 inches in diameter) balls, use of such fillers and modifying agents will be limited in order to meet the U.S.G.A. maximum weight limitations of 1.620 ounces. Exemplary fillers include mineral fillers such as zinc oxide, limestone, silica, mica, barytes, lithophone, zinc sulphide, talc, calcium carbonate, clays, powdered metals and alloys such as bismuth, brass, bronze, cobalt, copper, iron, nickel, tungsten, aluminum, tin, etc. Limestone is ground calcium/magnesium carbonate and is used because it is an inexpensive, heavy filler.

The use of multiple core layers disposed about a central high density core component enables detailed adjustments to the properties and characteristics of the resulting golf ball.

Since the specific gravity of the inner core layer or component is preferably adjusted upwardly relative to the specific gravity of the outer core layer so as to provide a low moment of inertia ball and at the same time set the total weight of the entire core in a specific range, the amount of the filler can vary widely. It is also possible to provide an outer core layer with a light-weight filler material, such as hollow resin particles, hollow glass particles or other low specific gravity particles, a foamed rubber, a foamed resin, or the like to achieve a similar result.

The use of foamed resins including foamed metallocene polymers allows for adjustment in the density or mass distribution of the ball to adjust the moment of inertia, and thus the spin rate and performance of the ball. Foamed materials also offer a potential cost savings due to the reduced use of polymeric material. Where the inner core layer is formed from a foamed metallocene polymer blend, the density increasing filler material can be added to the outer core layer to distribute the mass of the ball towards the outer surface and increase the moment of inertia. Conversely, where the foamed layer forms the outer core layer, the density increasing filler material can be added to the inner core layer to decrease the moment of inertia.

Ground flash filler or regrind also may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing and increase the activity of the cure rate resulting in higher C.O.R. Generally, free fatty acids having from about 10 to about 40 carbon atoms, and preferably having from about 15 to about 20 carbon atoms, are used. Exemplary of suitable fatty acids are stearic acid, linoleic acid, and palmitic acid, as well as mixtures thereof. Exemplary of suitable metallic salts of fatty acids include zinc stearate. When included in the core compositions, the fatty acid components are present in amounts of from about 1 to about 25, and preferably in amounts from about 2 to about 15 parts by weight based on 100 parts rubber (elastomer).

It is preferred that the core compositions include stearic acid as the fatty acid adjunct in an amount of from about 2 to about 18 parts by weight per 100 parts of rubber. Fatty acids are used when metallic salts of fatty acids are not included in the core formulation.

Diisocyanates may also be optionally included in the core layer compositions. When utilized, the diiosyanates are included in amounts of from about 0.2 to about 5.0 parts by weight based on 100 parts rubber. Exemplary of suitable diisocyanates is 4,4'-diphenylmethane diiosyanate and other polyfunctional isocyanates known to the art.

Furthermore, the dialkyl tin difatty acids set forth in U.S. Pat. No. 4,844,471, the dispersing agents disclosed in U.S. Pat. No. 4,844,471, the dispersing agents disclosed in U.S.

Pat. No. 4,838,556, and the dithiocarbamates set forth in U.S. Pat. No. 4,852,884 may also be incorporated into the polybutadiene compositions of the present invention. The specific types and amounts of such additives are set forth in the above-identified patents, which are incorporated herein by reference.

The core layer compositions of the invention are preferably comprised of 100 parts by weight of a base elastomer (or rubber) selected from polybutadiene and mixtures of polybutadiene with other elastomers, about 2 to 50 and preferably 5 to 25 parts by weight of at least one metallic salt of an unsaturated carboxylic acid, and 0.5 to 10 and preferably 1 to 5 parts by weight of a free radical initiator.

As indicated above, additional suitable and compatible modifying agents such as particulate polypropylene resin, fatty acids, and secondary additives such as Pecan shell flour, ground flash (i.e. grindings from previously manufactured cores of substantially identical construction), barium sulfate, zinc oxide, powdered metals, etc. may be added to the core layer compositions to adjust the finished weight of the ball as necessary in order to have the finished molded ball (core, cover and coatings) closely approach the U.S.G.A. weight limit of 1.620 ounces.

As noted, for embodiments utilizing two or more core layers, the specific gravity of each layer can be adjusted to alter the properties of the resulting golf ball. Accordingly, the specific gravity controlling filler may be added to only the outer core layer where a higher specific gravity is required in that layer relative to the inner core layer. In most instances, the difference in specific gravity between the core layers should be greater than 0.1 and preferably to at least about 0.2 or more, i.e. up to about 0.6, with the higher differentials being provided in those balls having the higher specific gravity in the inner core layer. The specific gravity of the inner core layer may vary from about 1.0 to about 2.0 while the specific gravity of the outer core layer varies from about 0.7 to about 1.6. The preferred range of specific gravity for the inner core layer is between about 1.5 and 19.4 when a very low moment of inertia is desired and the inner core layer has a higher specific gravity than the outer core layer. In that instance the outer core layer has a specific gravity in the range of about 0.8 to 1.2. Conversely, when the outer core layer has the higher specific gravity, the preferred range of specific gravity for the outer core layer is between about 1.2 and 1.6, and that of the inner core layer is about 1.0 to 1.2.

The outer diameter of the high density center core component and the outer diameter of the outermost core layer may vary. The center core component preferably is in the form of a metallic sphere. The diameter of the center core may vary depending upon its specific gravity and the other components in the golf ball. Typically, the center core component has a diameter in the range of from about 0.20 inches to about 0.40 inches. Preferred diameters include from about 0.3125 inches ($5/16"$), including about 0.3438 inches ($11/32"$), to about 0.375 inches ($3/8"$). It will be understood that a wide array of core diameters could be used depending upon the specific gravity and overall size and weight requirements for the resulting golf ball. The outer diameter of the core layer(s) is typically adjusted to accommodate the center core component and other characteristics of the desired golf balls.

The cores of the inventive golf balls typically have a coefficient of restitution of about 0.730 or more, more preferably about 0.750 or more, and most preferably about 0.780 or more. The cores have a PGA compression of about 90 or less, and more preferably 70 or less. The cores have a weight of 25–40 grams and preferably 30–40 grams and a Shore C hardness of less than 80, with the preferred Shore C hardness being about 50–75. Generally, 5 parts of zinc oxide are used to activate the cure system of the core layer compound. Amounts greater than 5 parts of zinc oxide are used to increase the core weight so that the finished ball more closely approaches the upper limit of 1.620 ounces.

In producing golf ball core layers utilizing the present compositions, the ingredients may be intimately mixed using, for example, two roll mills or a Banbury® mixer until the composition is uniform, usually over a period of from about 5 to about 20 minutes. The sequence of addition of the components is not critical. A preferred blending sequence is as follows.

The elastomer, cross linking agent, fillers, zinc salt, metal oxide, fatty acid, and the metallic dithiocarbamate (if desired), surfactant (if desired), and tin difatty acid (if desired), are blended for about 7 minutes in an internal mixer such as a Banbury® mixer. As a result of shear during mixing, the temperature rises to about 200° F. The mixing is desirably conducted in such a manner that the composition does not reach incipient polymerization temperatures during the blending of the various components. The initiator and diisocyanate are then added and the mixing continued until the temperature reaches about 220° F., whereupon the batch is discharged onto a two roll mill, mixed for about one minute and sheeted out.

The sheet is rolled into a "pig" and then placed in a Barwell® preformer and slugs of the desired weight are produced. The slugs to be used for the core layer are then subjected to compression molding at about 130° C. to about 180° C. for about 10 to 50 minutes. Note that the temperature in the molding process is not always required to be constant, and may be changed in two or more steps. In fact, the slugs or preforms for the core layer are frequently preheated for about one half hour at about 75° C. prior to molding.

The core layer is usually formed by placing a rubber composition preform mass, sheet or shell for the production of the core layer in the top and bottom hemispheres of a mold with a center core mold form therebetween and then press-molding. The resultant hemispheres are combined with the center core component and cured.

The above-mentioned arrangement may vary considerably, and therefore a method of forming a half shell and adhering the same can be adopted, as well as an injection or transfer molding method. Nearly any type of operation may be utilized to incorporate the high density center core component within one or more core layers.

When the core layer is formed from foamed resin, the core layer is preferably injection-molded or press-molded. In the case of injection molding, the process is carried out preferably at a temperature of 20° to 250° C. for a heating time of 2 to 20 minutes in the mold.

After molding, the molded core assemblies are cooled, the cooling effected at room temperature for about 4 hours or in cold water for about one hour. The molded cores are subjected to a centerless grinding operation whereby a thin layer of the molded core is removed to produce a round core having a diameter of about 1.470 to 1.545 inches. Alternatively, the cores are used in the as-molded state with no grinding needed to achieve roundness.

Usually the curable component of the composition will be cured by heating the composition at elevated temperatures on the order of from about 270° C. to about 350° F., preferably and usually from about 290° C. to about 325° F., with molding of the composition effected simultaneously with the curing thereof. The composition can be formed into a core structure by any one of a variety of molding techniques, e.g., injection, compression, or transfer molding. When the composition is cured by heating, the time required for heating will normally be short, generally from about 2 to about 20 minutes, depending upon the particular curing agent used and method of molding. Those of ordinary skill in the art relating to free radical curing agents for polymers are conversant with adjustments of cure times and temperatures required to effect optimum results with any specific free radical agent.

After molding, the core is removed from the mold and the surface thereof preferably is treated to facilitate adhesion thereof to the covering materials. Surface treatment can be effected by any of the several techniques known in the art, such as corona discharge, ozone treatment, sand blasting, brush tumbling, and the like. Preferably, surface treatment is effected by grinding with an abrasive wheel. The weight of the center core component is preferably adjusted so that the total weight of the center core and one or more core layers fall within a range of 30 to 38 g.

The core is converted into a golf ball by applying a cover, preferably a dual layer of covering material thereon, ranging in thickness from about 0.070 to about 0.130 inches and preferably from about 0.0675 to about 0.1275 inches. The cover is preferably as follows.

Cover Assembly

The inner layer of the cover is preferably comprised of a high acid (i.e. greater than 16 weight percent acid) ionomer resin or high acid ionomer blend. Preferably, the inner layer is comprised of a blend of two or more high acid ionomer resins neutralized to various extents by different metal cations. The inner cover layer may or may not include a metal stearate (e.g. zinc stearate) or other metal fatty acid salt. The purpose of the metal stearate or other metal fatty acid salt is to lower the cost and improve processing without affecting the overall performance of the finished golf ball. The inner layer may be comprised of a low acid (i.e. 16 weight percent acid or less) ionomer blend. Preferably, the inner layer is comprised of a blend of two or more low acid (i.e. 16 weight percent acid or less) ionomer resins neutralized to various extents by different metal cations.

Two principal properties involved in golf ball performance are resilience and hardness. Resilience is determined by the coefficient of restitution (C.O.R.), the constant "e" which is the ratio of the relative velocity of an elastic sphere after direct impact to that before impact. As a result, the coefficient of restitution ("e") can vary from 0 to 1, with 1 being equivalent to a perfectly or completely elastic collision and 0 being equivalent to a perfectly or completely inelastic collision.

Resilience (C.O.R.) along with additional factors such as club head speed, angle of trajectory and ball configuration (i.e. dimple pattern), ball weight and size generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. Although both the core and the cover contribute to the coefficient of restitution, the present invention is directed to the enhanced coefficient of restitution (and thus travel distance) which is affected by the cover composition.

In this regard, the coefficient of restitution of a golf ball is generally measured by propelling a ball at a given speed against a hard surface and measuring the ball's incoming and outgoing velocity electronically. As mentioned above, the coefficient of restitution is the ratio of the outgoing velocity to the incoming velocity. The coefficient of restitution must be carefully controlled in all commercial golf balls in order for the ball to be within the U.S.G.A. specifications. Along this line, the U.S.G.A. standards indicate that a "regulation" ball cannot have an initial velocity (i.e the speed off the striker) exceeding 255 feet per second. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e. hardness) to produce enhanced playability (i.e. spin, feel, etc.).

The hardness of the ball is a second principal property involved in the performance of a golf ball. The hardness of the ball can affect the playability of the ball on striking and the sound or "click" produced. Hardness is determined by the deformation (i.e. compression) of the ball under various load conditions applied across the ball's diameter (i.e. the lower the deformation value, the harder the material). As indicated in U.S. Pat. No. 4,674,751, softer covers permit the accomplished golfer to impart increased spin. This is because the softer covers deform on impact significantly more than balls having "harder" ionomeric resin covers. As a result, the better player is allowed to impart fade, draw or backspin to the ball thereby enhancing the playability. Such properties may be determined by various spin rate tests which are described hereinafter.

It has been found that a hard inner cover layer provides for a substantial increase in resilience (i.e. enhanced distance) over known multi-layer covered balls. The softer outer cover layer provides for desirable "feel" and high spin rate while maintaining respectable resiliency. The soft outer cover layer allows the cover to deform more during impact and increases the area of contact between the club face and the cover, thereby imparting more spin on the ball. As a result, the soft cover provides the ball with a balata-like feel and playability characteristics with improved distance and durability. Consequently, the overall combination of the multi-component core assembly and inner and outer cover layers results in a golf ball having enhanced resilience (improved travel distance) and durability (i.e. cut resistance, etc.) characteristics while maintaining, and in many instances, improving the playability properties of the ball.

The combination of a hard inner cover layer with a soft, relatively low modulus ionomer, ionomer blend or other non-ionomeric thermoplastic elastomer outer cover layer provides for excellent overall coefficient of restitution (i.e. excellent resilience) because of the improved resiliency produced by the inner cover layer. While some improvement in resiliency is also produced by the outer cover layer, the outer cover layer generally provides for a more desirable feel and high spin, particularly at lower swing speeds with highly lofted clubs such as half wedge shots.

The inner cover layer is harder than the outer cover layer and generally has a thickness in the range of 0.01 to 0.10 inches, preferably 0.03 to 0.07 inches for a 1.68 inch ball and 0.05 to 0.10 inches for a 1.72 inch (or more) ball. The inner cover layer has a Shore D hardness of 60 or more. It is particularly advantageous if the golf balls of the present invention have an inner layer with a Shore D hardness of 65 or more. The above-described characteristics of the inner cover layer provide an inner ball having a PGA compression of 100 or less. It is found that when the inner ball has a PGA compression of 90 or less, excellent playability results.

The high acid ionomers which may be suitable for use in formulating the inner cover layer compositions are ionic copolymers which are the metal, i.e. sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e. iso- or n-butyl acrylate, etc.) can also be included to produce a softer terpolymer. The carboxylic acid groups of the copolymer are partially neutralized (i.e. approximately 10–100%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Several new metal cation neutralized high acid ionomer resins have been produced by neutralizing, to various extents, high acid copolymers of an alpha-olefin and an alpha, beta-unsaturated carboxylic acid with a wide variety of different metal cation salts. This discovery is the subject matter of U.S. application Ser. No. 08/493,089, incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the inner cover layer for the golf ball of the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, and ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. More preferably, the copolymer contains about 20% acrylic acid with the remainder being ethylene.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for production of an inner cover layer of a multi-layered golf ball. By using these high acid ionomer resins, harder, stiffer inner cover layers having higher C.O.R.s, and thus longer distance can be obtained.

More preferably, it has been found that when two or more of the above-indicated high acid ionomers, particularly blends of sodium and zinc high acid ionomers, are processed to produce the covers of multi-layered golf balls, (i.e. the inner cover layer herein) the resulting golf balls will travel further than previously known multi-layered golf balls produced with low acid ionomer resin covers due to the balls' enhanced coefficient of restitution values.

The low acid ionomers which may be suitable for use in formulating the inner layer compositions are ionic copolymers which are the metal, i.e. sodium, zinc magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e. iso- or n-butyl acrylate, etc.) can also be included to produce a softer terpolymer. The carboxylic acid groups of the copolymer are partially neutralized (i.e. approximately 10–100% preferably 30–70%) by the metal ions. Each of the low acid ionomer resins which may be included in the inner layer cover compositions of the invention contains 16% by weight or less of a carboxylic acid.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc ionomers, are processed to produce the covers of multi-layered golf balls, (i.e. the inner cover layer herein) the resulting golf balls will travel further and at an enhanced spin rate than previously known multi-layered golf balls, such an improvement is particularly noticeable in enlarged or oversized golf balls.

While the core with the hard inner cover layer formed thereon provides the multi-layer golf ball with power and distance, the outer cover layer is preferably comparatively softer than the inner cover layer. The softness provides for the feel and playability characteristics typically associated with balata or balata-blend balls. The outer cover layer or ply is comprised of a relatively soft, low modulus (about 1,000 psi to about 10,000 psi) and low acid ionomer, an ionomer blend, a non-ionomeric thermoplastic or thermosetting material such as, but not limited to, a metallocene catalyzed polyolefin such as EXACT material available from EXXON, a polyurethane, a polyester elastomer such as that marketed by DuPont under the trademark Hytrel®, or a polyester amide such as that marketed by Elf Atochem S.A. under the trademark Pebax®, a blend of two or more non-ionomeric thermoplastic or thermosetting materials, or a blend of one or more ionomers and one or more non-ionomeric thermoplastic materials. The outer layer is fairly thin (i.e. from about 0.010 to about 0.10 inches in thickness, more desirably 0.03 to 0.06 inches in thickness for a 1.680 inch ball and 0.04 to 0.07 inches in thickness for a 1.72 inch or more ball), but thick enough to achieve desired playability characteristics while minimizing expense. Thickness is defined as the average thickness of the non-dimpled areas of the outer cover layer. The outer cover layer has a Shore D hardness of 55 or less, and more preferably 50 or less.

In one embodiment, the outer cover layer preferably is formed from an ionomer which constitutes at least 75 weight % of an acrylate ester-containing ionic copolymer or blend of acrylate ester-containing ionic copolymers. This type of outer cover layer in combination with the core and inner cover layer described above results in golf ball covers having a favorable combination of durability and spin rate. The one or more acrylate ester-containing ionic copolymers each contain an olefin, an acrylate ester, and an acid. In a blend of two or more acrylate ester-containing ionic copolymers, each copolymer may contain the same or a different olefin, acrylate ester and acid than are contained in the other copolymers. Preferably, the acrylate ester-containing ionic copolymer or copolymers are terpolymers, but additional monomers can be combined into the copolymers if the monomers do not substantially reduce the scuff resistance or other good playability properties of the cover.

For a given copolymer, the olefin is selected from the group consisting of olefins having 2 to 8 carbon atoms, including, as nonlimiting examples, ethylene, propylene, butane-1, hexene-1 and the like. Preferably the olefin is ethylene.

The acrylate ester is an unsaturated monomer having from 1 to 21 carbon atoms which serves as a softening comonomer. The acrylate ester preferably is methyl, ethyl, n-propyl, n-butyl, n-octyl, 2-ethylhexyl, or 2-methoxyethyl 1-acrylate, and most preferably is methyl acrylate or n-butyl acrylate. Another suitable type of softening comonomer is an alkyl vinyl ether selected from the group consisting of n-butyl, n-hexyl, 2-ethylhexyl, and 2-methoxyethyl vinyl ethers.

The acid is a mono- or dicarboxylic acid and preferably is selected from the group consisting of methacrylic, acrylic, ethacrylic, α-chloroacrylic, crotonic, maleic, fumaric, and itaconic acid, or the like, and half esters of maleic, fumaric and itaconic acid, or the like. The acid group of the copolymer is 10–100% neutralized with any suitable cation, for example, zinc, sodium, magnesium, lithium, potassium, calcium, manganese, nickel, chromium, tin, aluminum, or the like. It has been found that particularly good results are obtained when the neutralization level is about 50–100%

The one or more acrylate ester-containing ionic copolymers each has an individual Shore D hardness of about 40–64. The overall Shore D hardness of the outer cover is 55 or less, and generally is 40–55. It is preferred that the overall Shore D hardness of the outer cover is in the range of 40–50 in order to impart particularly good playability characteristics to the ball.

The outer cover layer of the preferred embodiment golf ball is formed over a core to result in a golf ball having a coefficient of restitution of at least 0.770, more preferably at least 0.780, and most preferably at least 0.790. The coefficient of restitution of the ball will depend upon the properties of both the core and the cover. The PGA compression of the golf ball is 100 or less, and preferably is 90 or less.

The acrylate ester-containing ionic copolymer or copolymers used in the outer cover layer can be obtained by neutralizing commercially available acrylate ester-containing acid copolymers such as polyethylene-methyl acrylate-acrylic acid terpolymers, including ESCOR ATX (Exxon Chemical Company) or poly (ethylene-butyl acrylate-methacrylic acid) terpolymers, including NUCREL (DuPont Chemical Company). Particularly preferred commercially available materials include ATX 320, ATX 325, ATX 310, ATX 350, and blends of these materials with NUCREL 010 and NUCREL 035. The acid groups of these materials and blends are neutralized with one or more of various cation salts including zinc, sodium, magnesium, lithium, potassium, calcium, manganese, nickel, etc. The degree of neutralization ranges from 10–100%. Generally, a higher degree of neutralization results in a harder and tougher cover material.

The ionomer resins used to form the outer cover layers can be produced by reacting the acrylate ester-containing acid copolymer with various amounts of the metal cation salts at a temperature above the crystalline melting point of the copolymer, such as a temperature from about 200° F. to about 500° F., preferably from about 250° F. to about 350° F., under high shear conditions at a pressure of from about 100 psi to 10,000 psi. Other well known blending techniques may also be used. The amount of metal cation salt utilized to produce the neutralized ionic copolymers is the quantity which provides a sufficient amount of the metal cations to neutralize the desired percentage of the carboxylic acid groups in the high acid copolymer. When two or more different copolymers are to be used, the copolymers can be blended before or after neutralization. Generally, it is preferable to blend the copolymers before they are neutralized to provide for optimal mixing.

The compatibility of the acrylate ester-containing copolymers with each other in a copolymer blend produces a golf ball outer cover layer having a surprisingly good scuff resistance for a given hardness of the outer cover layer. The golf ball according to the invention has a scuff resistance of no higher than 3.0. It is preferred that the golf ball has a scuff resistance of no higher than about 2.5 to ensure that the golf ball is scuff resistant when used in conjunction with a variety of types of clubs, including sharp-grooved irons, which are particularly inclined to result in scuffing of golf ball covers. The best results according to the invention are obtained when the outer cover layer has a scuff resistance of no more than about 2.0.

The outer layer may include a blend of a soft (low acid) ionomer resin with a small amount of a hard (high acid) ionomer resin. A low modulus ionomer suitable for use in the outer layer blend has a flexural modulus measuring from about 1,000 to about 10,000 psi, with a hardness of about 20 to about 40 on the Shore D scale. A high modulus ionomer herein is one which measures from about 15,000 to about 70,000 psi as measured in accordance with ASTM method D-790. The hardness may be defined as at least 50 on the Shore D scale as measured in accordance with ASTM method D-2240.

Soft ionomers primarily are used in formulating the hard/soft blends of the cover compositions. These ionomers include acrylic acid and methacrylic acid based soft ionomers. They are generally characterized as comprising sodium, zinc, or other mono- or divalent metal cation salts of a terpolymer of an olefin having from about 2 to 8 carbon atoms, methacrylic acid, acrylic acid, or another $\alpha$, $\beta$-unsaturated carboxylic acid, and an unsaturated monomer of the acrylate ester class having from 1 to 21 carbon atoms. The soft ionomer is preferably made from an acrylic acid base polymer in an unsaturated monomer of the acrylate ester class.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the inner and outer cover layers. The combination provides higher C.O.R.s at equal or softer hardness, higher melt flow (which corresponds to improved, more efficient molding, i.e. fewer rejects) as well as significant cost savings versus the outer layer of multi-layer balls produced by other known hard-soft ionomer blends as a result of the lower overall raw materials costs and improved yields.

In addition, test data indicates that Iotek 7520 resins have Shore D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, it has been found that an acrylic acid based soft ionomer available from the Exxon Corporation under the designation Iotek 7510 is also effective when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn® 8625 and the Surlyn® 8629 combinations disclosed in U.S. Pat. No. 4,884,814).

In addition, Iotek 7510, when compared to Iotek 7520, produces slightly higher C.O.R. values at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 weight % neutralized and Iotek 7510 is estimated to be about 40–60 weight % neutralized. The hard ionomer resins utilized to produce the outer cover layer composition hard/soft blends include ionic copolymers which are the sodium, zinc, magnesium, lithium, etc. salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e. the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the outer cover blends include the hard sodium ionic copolymer sold under the trademark Surlyn® 8940 and the hard zinc ionic copolymer sold under the trademark Surlyn® 9910. Surlyn® 8940 is a copolymer of ethylene with methacrylic acid and about 15% weight percent acid which is about 29 percent neutralized with sodium ions. This resin has an average melt flow index of about 2.8. Surlyn® 9910 is a copolymer of ethylene and methacrylic acid with about 15 weight percent acid which is about 58 percent neutralized with zinc ions. The average melt flow index of Surlyn® 9910 is about 0.7.

It has been determined that when hard/soft ionomer blends are used for the outer cover layer, good results are achieved when the relative combination is in a range of about 3–25 percent hard ionomer and about 75–97 percent soft ionomer.

Moreover, in alternative embodiments, the outer cover layer formulation may also comprise up to 100 wt % of a soft, low modulus non-ionomeric thermoplastic material including a polyester polyurethane such as B.F. Goodrich Company's Estane® polyester polyurethane X-4517. The non-ionomeric thermoplastic material may be blended with a soft ionomer. For example, polyamides blend well with soft ionomer.

Other soft, relatively low modulus non-ionomeric thermoplastic materials may also be utilized to produce the outer cover layer as long as the non-ionomeric thermoplastic materials produce the playability and durability characteristics desired without adversely affecting the enhanced travel distance characteristic produced by the high acid ionomer resin composition. These include, but are not limited to thermoplastic polyurethanes such as Texin thermoplastic polyurethanes from Mobay Chemical Co. and the Pellethane thermoplastic polyurethanes from Dow Chemical Co; non-ionomeric thermoset polyurethanes including but not limited to those disclosed in U.S. Pat. No. 5,334,673; cross-linked metallocene catalyzed polyolefins; ionomer/rubber blends such as those in Spalding U.S. Pat. Nos. 4,986,545; 5,098,105 and 5,187,013; and, Hytrel polyester elastomers from DuPont and Pebax polyesteramides from Elf Atochem S.A.

In preparing golf balls in accordance with the present invention, a hard inner cover layer is molded (by injection molding or by compression molding) about a core (preferably a solid core). A comparatively softer outer layer is molded over the inner layer.

The solid core for the multi-layer ball is about 1.2–1.6 inches in diameter, although it may be possible to use cores in the range of about 1.0–1.7 inches when the finished golf ball is oversized, i.e. 1.740 inches in diameter.

The inner cover layer which is molded over the core is about 0.01 inches to about 0.10 inches in thickness, preferably about 0.03–0.07 inches thick. The inner ball which includes the core and inner cover layer preferably has a diameter in the range of 1.25 to 1.60 inches. The outer cover layer is about 0.01 inches to about 0.10 inches in thickness. Together, the core, the inner cover layer and the outer cover layer combine to form a ball having a diameter of 1.680 inches or more, the minimum diameter permitted by the rules of the United States Golf Association and weighing no more than 1.62 ounces.

In a particularly preferred embodiment of the invention, the golf ball has a dimple pattern which provides coverage of 65% or more. The golf ball typically is coated with a durable, abrasion-resistant, relatively non-yellowing finish coat.

The various cover composition layers of the present invention may be produced according to conventional melt blending procedures. Generally, the copolymer resins are blended in a Banbury® type mixer, two-roll mill, or extruder prior to neutralization. After blending, neutralization then occurs in the melt or molten state in the Banbury® mixer. Mixing problems are minimal because preferably more than 75 wt %, and more preferably at least 80 wt % of the ionic copolymers in the mixture contain acrylate esters, and in this respect, most of the polymer chains in the mixture are similar to each other. The blended composition is then formed into slabs, pellets, etc., and maintained in such a state until molding is desired. Alternatively, a simple dry blend of the pelletized or granulated resins which have previously been neutralized to a desired extent and colored master batch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the high acid ionomer resin compositions used to produce the inner cover layer. In one embodiment of the invention, a masterbatch of non-acrylate ester-containing ionomer with pigments and other additives incorporated therein is mixed with the acrylate ester-containing copolymers in a ratio of about 1–7 weight % master batch and 93–99 weight % acrylate ester-containing copolymer.

The golf balls of the present invention can be produced by molding processes which include but are not limited to those which are currently well known in the golf ball art. For example, the golf balls can be produced by injection molding or compression molding the novel cover compositions around the solid molded core to produce an inner ball which typically has a diameter of about 1.50 to 1.67 inches. The outer layer is subsequently molded over the inner layer to produce a golf ball having a diameter of 1.620 inches or more, and preferably about 1.680 inches or more. The standards for both the minimum diameter and maximum weight of the balls are established by the United States Golf Association (U.S.G.A.).

In compression molding, the inner cover composition is formed via injection at about 380° F. to about 450° F. into smooth surfaced hemispherical shells which are then positioned around the core in a mold having the desired inner cover thickness and subjected to compression molding at 200° to 300° F. for about 2 to 10 minutes, followed by cooling at 50° to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° to about 100° F. Subsequently, the outer cover layer is molded about the core and the inner layer by similar compression or injection molding techniques to form a dimpled golf ball of a diameter of 1.680 inches or more.

After molding, the golf balls produced may undergo various further processing steps such as buffing, painting and marking as disclosed in U.S. Pat. No. 4,911,451, herein incorporated by reference.

Mantle

As previously noted, the present invention golf balls include one or more optional mantle layers.

A wide array of polymeric materials can be utilized to form the one or more mantle layers. Thermoplastic materials are generally preferred for use as materials for the one or more mantle layers. Typically, such materials should exhibit good flowability, moderate stiffness, high abrasion resistance, high tear strength, high resilience, and good mold release, among others.

Synthetic polymeric materials which may be used in accordance with the present invention include homopolymeric and copolymer materials which, so long as they do not detract from the previously noted desired properties of the preferred embodiment golf balls, may include: (1) Vinyl resins formed by the polymerization of vinyl chloride, or by the copolymerization of vinyl chloride with vinyl acetate, acrylic esters or vinylidene chloride; (2) Polyolefins such as polyethylene, polypropylene, polybutylene, and copolymers such as polyethylene methylacrylate, polyethylene ethylacrylate, polyethylene vinyl acetate, polyethylene methacrylic or polyethylene acrylic acid or polypropylene acrylic acid or terpolymers made from these and acrylate esters and their metal ionomers, polypropylene/EPDM grafted with acrylic acid or anhydride modified polyolefins; (3) Polyurethanes, such as are prepared from polyols and diisocyanates or polyisocyanates; (4) Polyamides such as poly(hexamethylene adipamide) and others prepared from diamines and dibasic acids, as well as those from amino acid such as poly(caprolactam), and blends of polyamides with SURLYN, polyethylene, ethylene copolymers, EDPA, etc; (5) Acrylic resins and blends of these resins with polyvinyl chloride, elastomers, etc.; (6) Thermoplastic rubbers such as the urethanes, olefinic thermoplastic rubbers such as blends of polyolefins with EPDM, block copolymers of styrene and butadiene, or isoprene or ethylene-butylene rubber, polyether block amides; (7) Polyphenylene oxide resins, or blends of polyphenylene oxide with high impact polystyrene; (8) Thermoplastic polyesters, such as PET, PBT, PETG, and elastomers sold under the trademark HYTREL by E. I. DuPont De Nemours & Company of Wilmington, Del.; (9) Blends and alloys including polycarbonate with ABS, PBT, PET, SMA, PE elastomers, etc. and PVC with ABS or EVA or other elastomers; and (10) Blends of thermoplastic rubbers with polyethylene, polypropylene, polyacetal, nylon, polyesters, cellulose esters, etc.

It is also within the purview of this invention to add to the polymeric spherical substrate compositions of this invention materials which do not affect the basic novel characteristics of the composition. Among such materials are antioxidants, antistatic agents, and stabilizers.

It is also contemplated that a wound construction could be utilized for one or more of the core layers and also for the optional mantle layer. However, as previously noted, a feature of the preferred embodiment golf balls is the elimination of wound layers or core components.

The resulting golf ball produced from the unique core, cover, and optional mantle as described herein with the hard inner cover layer and the relatively softer, low flexural modulus outer cover layer, provides for an improved multilayer golf ball exhibiting desirable coefficient of restitution and durability properties while at the same time offering the feel and spin characteristics associated with soft balata and balata-like covers of the prior art.

As indicated above, the golf ball of the invention is unique in that it provides good distance when hit with a driver, good control off of irons, and excellent spin on short chip shots. This golf ball is superior to conventional soft covered two-piece or wound balls in that it has lower spin off a driver and higher spin on short shots.

EXAMPLES

In many of the examples described herein, the terminology "1×2" or "2×2" is used. The first numeral refers to the core configuration, i.e. whether it is a single component (a "1" designation) or a dual core assembly (a "2" designation). The second numeral refers to the layer configuration, i.e. whether it is a single layer (a "1" designation) or a dual layer assembly (a "2" designation). The present invention is not limited to 1×2, 2×2, 1×1, and 2×1 configurations, but includes other arrangements such as those utilizing three core components and dual cover layers, i.e. 3×2, and three cover layers, with a single core component, i.e. 1×3. Other configurations are included in the present invention.

A series of trials were carried out in which various golf balls and components thereof were constructed and tested as follows. These golf balls featured spherical steel core components and a core layer enclosing the center core were compared. Details of these cores are set forth below in Table 1.

TABLE 1

| Core Layer Material | For 11/32" Steel Ball (Parts by Weight) | For 5/16" Steel Ball (Parts by Weight) |
|---|---|---|
| NEO CIS 60 | 70 | 70 |
| BCP-820 (BR-1220X)[1] | 30 | 30 |
| ZINC OXIDE | 9 | 12 |
| ZINC STEARATE | 16 | 16 |
| ZINC DIACRYLATE | 24 | 24 |
| TRIGONOX 42-40B[2] | 1.25 | 1.25 |
|  | 150.25 | 153.25 |

| Properties of Molded Cores | | |
|---|---|---|
|  | With 11/32" Steel Ball | With 5/16" Steel Ball |
| SIZE (INCHES) | 1.558 | 1.559 |
| WEIGHT (GRAMS) | 37.42 | 37.48 |
| COMPRESSION (RIEHLE) | 117 | 114 |
| C.O.R. | .784 | .787 |
| NES FACTOR | 901 | 901 |

[1]Cariflex polybutadiene from Muehlstein, Norwalk, CT.
[2]Akzo Chemical Inc. Chicago, IL.

The sum of the Riehle Compression and the C.O.R. give a number, the NES factor. The higher the number the higher the resilience. For example, a COR of 0.787 is three points faster than 0.784, but a Riehle compression of 114 is three points harder than 117. The net result is the same, a NES factor of 901 for both types of double cores.

As there was no difference in the NES factor when comparing the 11/32" steel ball core to the 5/16" steel ball, the 11/32" ball was used to make finished golf balls for flight testing. These molded dual core assemblies were as follows in Tables 2 and 3.

TABLE 2

| Core Layer Material | For 11/32" Steel Ball Parts by Weight |
|---|---|
| NEO CIS 60 | 70 |
| BCP-820 (BR-1220X)[1] | 30 |
| ZINC OXIDE | 11.5 |
| ZINC STEARATE | 16 |
| ZINC DIACRYLATE | 25 |
| TRIGONOX 42-40B[2] | 1.25 |
|  | 153.75 |

[1]Cariflex polybutadiene from Muehlstein, Norwalk, CT.
[2]Akzo Chemical Inc. Chicago, IL.

TABLE 3

| Properties of Molded Cores | |
|---|---|
| SIZE (INCHES) | 1.558 |
| WEIGHT (GRAMS) | 38.1 |
| COMPRESSION (RIEHLE) | 112 |
| C.O.R. | .781 |

The cores were cleaned and abraded and dimpled covers of two different types as set forth in Table 4, were injection molded over the double cores and appropriately finished.

TABLE 4

| | Parts by Weight |
|---|---|
| SD Cover Stock | |
| SURLYN 8120 | 7.5 |
| SURLYN 8320 | 17.5 |
| SURLYN 9910 | 49.2 |
| SURLYN 8940 | 16.2 |
| WHITE M.B.* | 9.4 |
| | 100 |
| Hot XL Cover Stock | |
| IOTEK 7030 | 38 |
| IOTEK 1003 | 52.5 |
| WHITE M.B.* | 9.5 |
| | 100.0 |
| *WHITE M.B. | |
| IOTEK 7030 | 75.58 |
| TITANIUM DIOXIDE | 23.66 |
| U.M. BLUE | 0.46 |
| EASTOBRITE | 0.26 |
| SANTONOX R | 0.04 |
| | 100.0 |

The resulting golf balls are summarized in Table 5.

TABLE 5

Properties of Finished Golf Balls

| | 1 × 2 Steel Core, SD Cover | 1 × 2 Steel Core, Hot XL Cover | Control, No Steel Core |
|---|---|---|---|
| SIZE (INCHES) | 1.682 | 1.683 | 1.685 |
| WEIGHT (GRAMS) | 45.8 | 45.8 | 45.8 |
| COMPRESSION (RIEHLE) | 94 | 87 | 78 |
| COMPRESSION (PGA) | 66 | 73 | 82 |
| C.O.R. | .805 | .822 | .811 |
| M.O.I. (OZ. INCH$^2$) | 0.42539 | 0.42558 | 0.44641 |
| SHORE D COVER HARDNESS | 62 | 70–71 | 70–71 |

Flight testing of the above balls using a number 5 Iron shows very similar results between the three balls. This is summarized in Table 6.

Driver distance however shown in Table 7, demonstrates that the longest ball is the 1×2 steel core with the Hot XL Cover followed by the 1×2 steel core with the SD Cover. The Control ball without the steel core was 4.58 yards shorter in total distance than the longest ball.

In summary, the 1×2 golf balls with the steel cores were longer in distance and had a lower Moment of Inertia than the two piece golf ball without the steel core.

TABLE 6

5 IRON DISTANCE REPORT

CLUB NAME: Top Flite Tour 5-Iron   CLUB HEAD SPEED (ft/sec): 121.74
COMMENTS: 5-IRON FOR 1 × 2 Balls   # Balls/Type 12

Average Test Conditions:

| | Pre-Test | Post-Test | | Pressure Settings |
|---|---|---|---|---|
| Setup Ball (Type): | | | Swing = | 88.5 |
| Launch Angle (Deg): | 14.5 | 14.6 | Brake = | 17.5 |
| Ball Speed (FPS): | 179.5 | 179 | | |
| Spin Rate (RPM): | 5932 | 5862 | | |
| Turf Condition | SOFT | | | |
| Wind (MPH/DIR): | 4.52 | 105.81 | | |
| 180 = Tailwind | | | | |
| Temp/RH (Deg %): | 75.01 | 37.45 | | |
| Pbar (mBAR) | 1015 | | | |

BALL TYPE:

| | TRAJ | FTIME | CARRY | CARDIFF | CTRDEV | ROLL | T DIST | T DIFF | T DEV |
|---|---|---|---|---|---|---|---|---|---|
| 1 × 2 Steel core-SD | 43.7 | 6.3 | 177.5 | −1.38 | −16.3 | 1.5 | 178.8 | −1.79 | −16.9 |
| 1 × 2 Steel Core-Hot XL | 44.6 | 6.2 | 178.9 | 0.00 | −16.9 | 1.8 | 180.6 | 0.00 | −17.3 |
| Control - No steel core | 44.2 | 6.3 | 176.4 | −2.50 | −15.6 | 2.8 | 179.1 | −1.50 | −16.8 |

TABLE 7

DRIVER DISTANCE REPORT

Club Name: Int. 9.5–1" Longer   Club Head Speed: 144.75 ft/sec.
Comments: Distance Test for 1 × 2 Center Balls   # Balls/Type 12

Average Test Conditions:

| | Pre-Test | Post-Test | Tee Position | | Pressure Settings | |
|---|---|---|---|---|---|---|
| Setup Ball (Type): | | | F/B = | 15.5 | SWING = | 78 |
| Launch Angle (Deg): | 10.0 | 10.3 | L/R = | 14.5 | BRAKE = | 11 |
| Ball Speed (FPS): | 203.8 | 205.2 | | | | |
| Spin Rate (RPM): | 3648 | 3802 | | | | |

TABLE 7-continued

DRIVER DISTANCE REPORT

Turf Condition: FIRM  FIRM
Wind (MPH/DIR): 5.58  180.88
180 = Tailwind
Temp/RH (Deg/%): 85.78  63.33
Pbar (mBAR): 1021

Ball Type:

|  | TRAJ | FTIME | CARRY | CARDIFF | CTRDEV | ROLL | T DIST | T DIFF | T DEV |
|---|---|---|---|---|---|---|---|---|---|
| 1 × 2 Steel Core-SD Cover | 15.5 | 5.7 | 228.1 | −2.71 | −8.3 | 11.7 | 239.8 | −1.63 | −8.4 |
| 1 × 2 Steel Core-Hot XL | 15.3 | 5.7 | 230.8 | 0.00 | −10.0 | 10.6 | 241.4 | 0.00 | −10.8 |
| Control - No steel core | 16.3 | 5.8 | 230.2 | −0.58 | −8.5 | 6.6 | 236.8 | −4.58 | −8.0 |

Another series of trials were conducted in which golf balls comprising spherical metal core components, i.e. 3/8" and 5/16" diameter steel balls, were formed. The composition of core layers molded about the spherical metal centers and aspects of the resulting golf balls are set forth below in Table 8.

TABLE 8

Tour Editions with 3/8" Steel Ball in Center

| Taktene[1] | 70.00 |
|---|---|
| BR-1220[2] | 30.00 |
| Zinc Diacrylate | 34.00 |
| 40 Mesh Regrind | 18.00 |
| Zinc Stearate | 20.00 |
| Trigonox[3] 17/40 | 0.70 |
| Papi 94 | 0.50 |
|  | 178.2 |

Finished Ball

| SIZE (diam.) | 1.683 inches |
|---|---|
| WGT | 46.6 grams |
| PGA COMPRESSION | 59 |
| $\bar{e}$ (C.O.R.) | .788 |

[1]Synthetic Polybutadiene Bayer Corp., Akron, OH.
[2]Cariflex Polybutadiene Muehlstein, Norwalk, CT.
[3]Akzo Chemical Inc. Chicago, IL.

Yet another series of trials were performed in which core assemblies comprising steel center cores were prepared and summarized in Table 9.

TABLE 9

Tour Edition with 5/16" Steel Ball Inside

|  | Parts by Weight | Lab Banbury (scale up) (Parts by Weight) |
|---|---|---|
| BR-1220[1] | 100.00 | 800 |
| Zinc Diacrylate | 34.00 | 272 |
| 40 Mesh Regrind | 18.00 | 144 |
| Zinc Oxide | 5.00 | 40 |
| Zinc Stearate | 20.00 | 160 |
| Trigonox 12/40[2] | 0.7 | 5.6 |
| Papi 94 | 0.5 | 4.0 |
|  | 178.2 |  |

[1]Cariflex Polybutadiene, Muehlstein, Norwalk, CT.
[2]Akzo Chemical Inc. Chicago, IL.

The core assemblies were formed as follows. Two batches were prepared, each having a different color. Top and bottom mold preforms with 5/16" indentations were formed. The resulting preforms were cured for 14 minutes at 310° F. and cooled. Core assemblies were formed of a top one-half molded on top of a bottom one-half with the steel center positioned between the two preforms. The resulting assembly was cured for 15 minutes at 310° F. and cooled. The adhesion between the top and bottom halves appeared excellent. The resulting core assemblies and balls are summarized below in Table 10.

TABLE 10

| (6) Centers with 5/16" steel ball |  | Hollow without steel ball (1 center only) |  |
|---|---|---|---|
| SIZE (diam.) | 1.570 inches | SIZE (diam.) | 1.570 inches |
| WEIGHT | 38.3 grams | WEIGHT | 36.2 grams |
| PGA COMPRESSION | 67 | PGA COMPRESSION | 76 |
| $\bar{e}$ (C.O.R.) | .784 (1 broke) | $\bar{e}$ (C.O.R.) | .771 |
| Finished Ball |  |  |  |
| SIZE (diam.) | 1.685 inches |  |  |
| WEIGHT | 45.3 grams |  |  |
| PGA COMPRESSION | 64 |  |  |
| $\bar{e}$ (C.O.R.) | .802 |  |  |

Additional testing was also conducted in which Titleist and Tour Edition balls with steel centers were compared to corresponding controls. Set forth below in Table 11 is data from spin testing of Tour Edition golf balls with steel centers. The test was performed with a standard forged Tour Edition nine iron, square hit.

Figure 5:
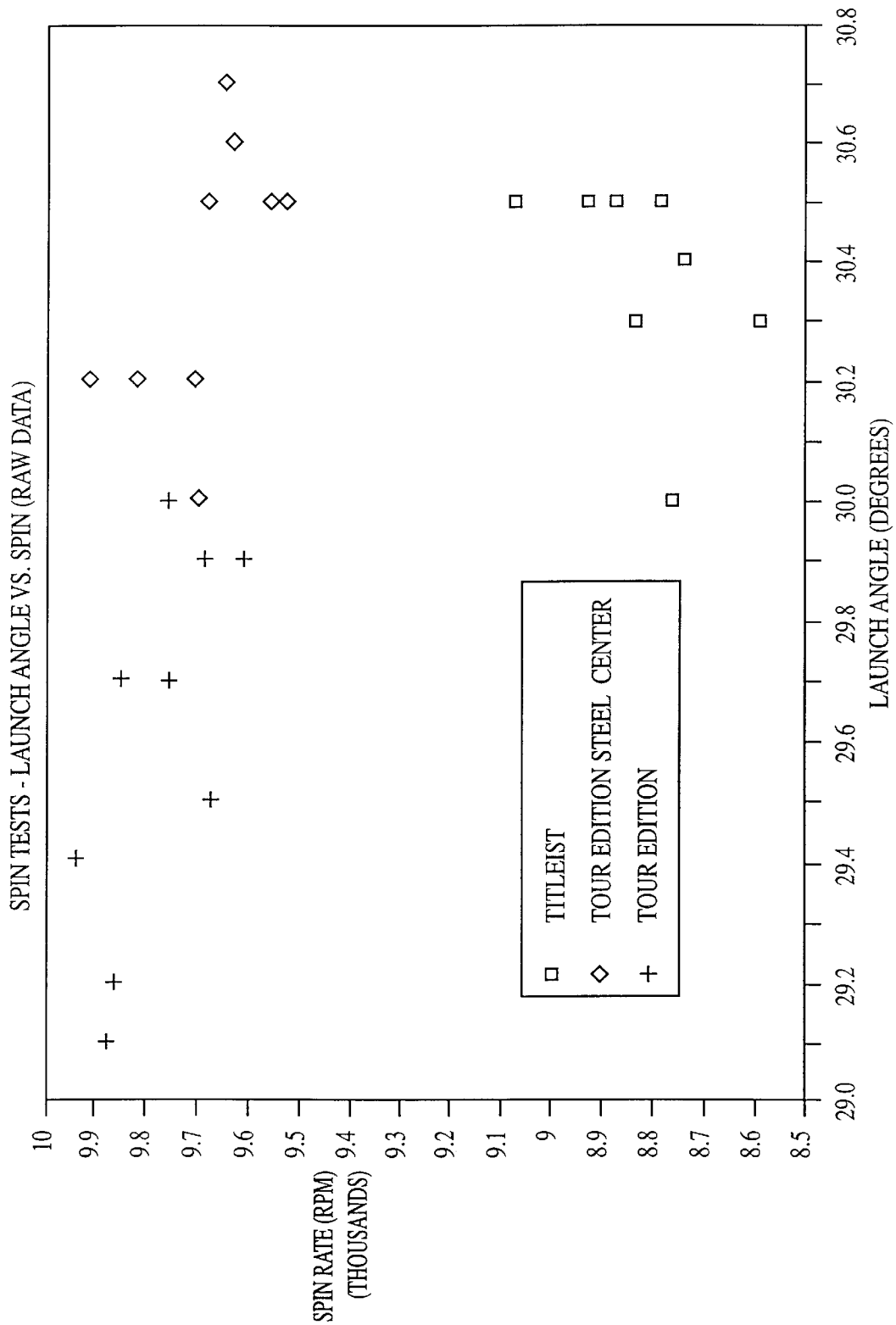
FIG. 5 is a graph illustrating the results of spin testing described herein.
Figure 6:
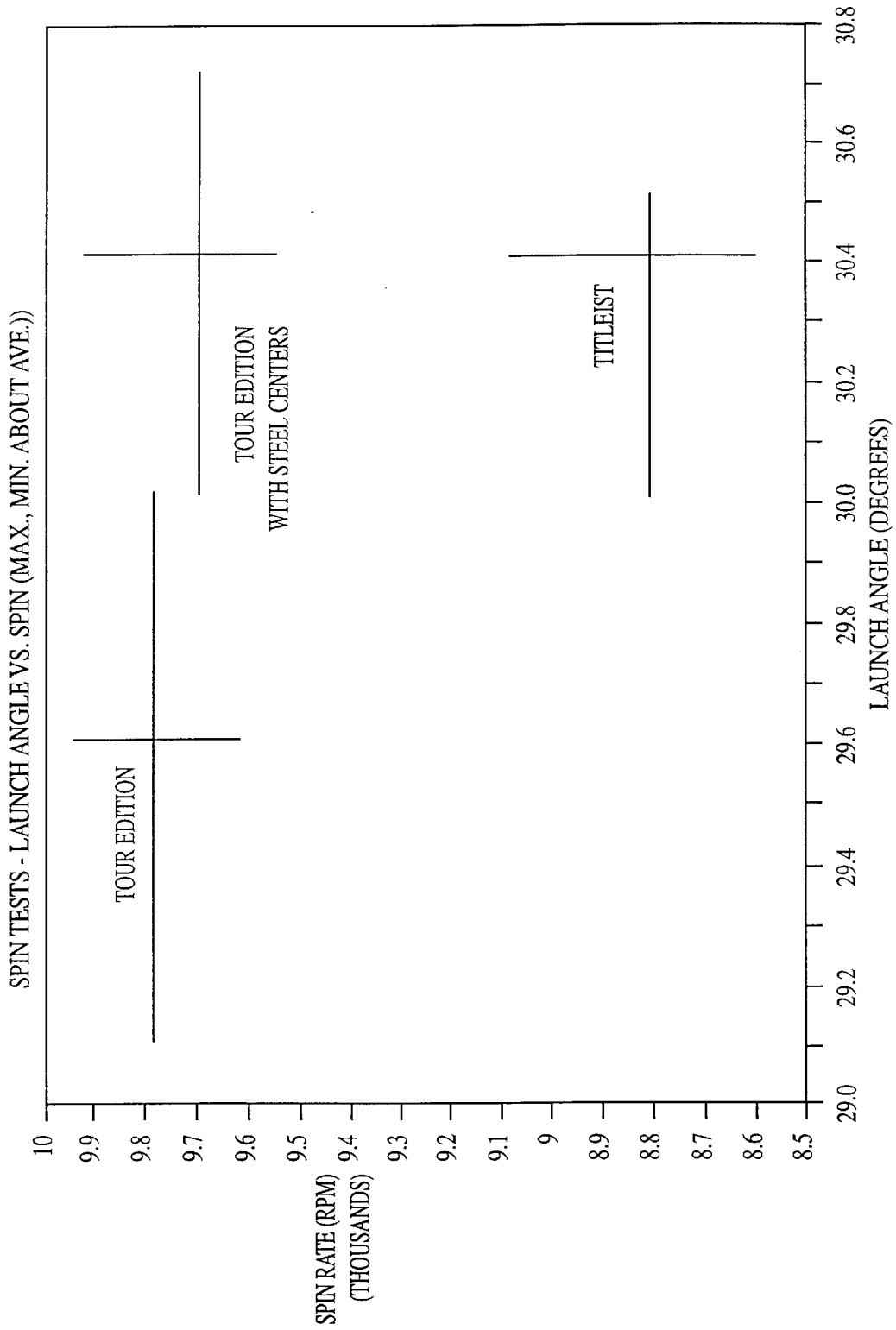
FIG. 6 is a graph illustrating in a different fashion, the results of spin testing described herein.

Results show that the steel center balls of the present invention have both high spin rate and high launch angle. They also had a higher speed than the Titleist and Tour Edition controls they were tested against, approximately 1 to 2 fps. FIGS. 5 and 6 illustrate raw data points and spreads about the averages for this testing.

TABLE 11

Tour Edition Steel Center Ball Spin Test

| Type | # | Hit | Launch Angle | Ave. SD. ball | type | Spd | Ave. SD. ball | type | RPM | Ave. SD. ball | type |
|---|---|---|---|---|---|---|---|---|---|---|---|
| Titleist (typical for all) | 1 | 1 | 30.5 | 30.4 | 30.4 | 116.0 | 114.1 | 113.2 | 8931 | 8915 | 8800 |
| Titleist | 1 | 2 | 30.5 | 0.047 | 0.156 | 113.8 | 1.408 | 1.154 | 9071 | 135 | 144 |
| Titleist | 1 | 3 | 30.4 | | | 112.6 | | | 8742 | | |
| Titleist | 2 | 1 | 30.5 | 30.3 | | 113.5 | 112.6 | | 8787 | 8715 | |
| Titleist | 2 | 2 | 30.3 | 0.205 | | 112.2 | 0.665 | | 8592 | 87 | |
| Titleist | 2 | 3 | 30.0 | | | 112.0 | | | 8765 | | |
| Titleist | 3 | 1 | 30.5 | 30.4 | | 112.9 | 112.8 | | 8874 | 8769 | |
| Titleist | 3 | 2 | 30.3 | 0.094 | | 112.3 | 0.340 | | | 123 | |
| Titleist | 3 | 3 | 30.3 | | | 113.1 | | | 8596 | | |
| | 1 | 1 | 29.9 | 29.5 | 29.6 | 112.5 | 113.6 | 113.9 | 9690 | 9830 | 9779 |
| | 1 | 2 | 29.4 | 0.294 | 0.302 | 114.2 | 0.779 | 0.816 | 9938 | 104 | 102 |
| | 1 | 3 | 29.2 | | | 114.1 | | | 9861 | | |
| | 2 | 1 | 29.7 | 29.5 | | 114.4 | 114.0 | | 9849 | 9826 | |
| | 2 | 2 | 29.1 | 0.283 | | 114.5 | 0.665 | | 9876 | 52 | |
| | 2 | 3 | 29.7 | | | 113.1 | | | 9754 | | |
| | 3 | 1 | 29.9 | 29.8 | | 115.2 | 114.0 | | 9612 | 9682 | |
| | 3 | 2 | 30.0 | 0.216 | | 113.0 | 0.918 | | 9761 | 61 | |
| | 3 | 3 | 29.5 | | | 113.7 | | | 9674 | | |
| Control | 1 | 1 | 30.5 | 30.4 | 30.4 | 115.5 | 115.6 | 115.1 | 9684 | 9675 | 9688 |
| Control | 1 | 2 | 30.2 | 0.170 | 0.220 | 116.1 | 0.411 | 0.706 | 9709 | 32 | 114 |
| Control | 1 | 3 | 30.6 | | | 115.1 | | | 9632 | | |
| Control | 2 | 1 | 30.2 | 30.3 | | 114.6 | 114.9 | | 9821 | 9723 | |
| Control | 2 | 2 | 30.0 | 0.294 | | 115.9 | 0.759 | | 9782 | 73 | |
| Control | 2 | 3 | 30.7 | | | 114.1 | | | 9666 | | |
| Control | 3 | 1 | 30.2 | 30.4 | | 115.0 | 114.8 | | 9915 | 9667 | |
| Control | 3 | 2 | 30.5 | 0.141 | | 113.9 | 0.704 | | 9556 | 176 | |
| Control | 3 | 3 | 30.5 | | | 115.6 | | | 9530 | | |

| Type | # | Hit | ON | OFF | POLE | WEIGHT | COMP | COEFF | Moment of Inertia |
|---|---|---|---|---|---|---|---|---|---|
| Titleist (typical for all) | 1 | 1 | 83 | 82 | 82 | 45.0 | 74 | 781 | 0.403 |
| Titleist | 1 | 2 | | | | | | | |
| Titleist | 1 | 3 | | | | | | | |
| Titleist | 2 | 1 | 82 | 77 | 80 | 45.2 | 76 | 776 | 0.406 |
| Titleist | 2 | 2 | | | | | | | |
| Titleist | 2 | 3 | | | | | | | |
| Titleist | 3 | 1 | 82 | 80 | 83 | 45.1 | 81 | 786 | 0.404 |
| Titleist | 3 | 2 | | | | | | | |
| Titleist | 3 | 3 | | | | | | | |
| | 1 | 1 | 83 | 83 | 81 | 45.3 | 53 | 810 | .442 |
| | 1 | 2 | | | | | | | |
| | 1 | 3 | | | | | | | |
| | 2 | 1 | 83 | 81 | 80 | 45.2 | 54 | 805 | .43 |
| | 2 | 2 | | | | | | | |
| | 2 | 3 | | | | | | | |
| | 3 | 1 | 84 | 83 | 84 | 45.4 | 57 | 813 | .44 |
| | 3 | 2 | | | | | | | |
| | 3 | 3 | | | | | | | |
| Control | 1 | 1 | 87 | 86 | 81 | 45.4 | 67 | 904 | .427 |
| Control | 1 | 2 | | | | | | | |
| Control | 1 | 3 | | | | | | | |
| Control | 2 | 1 | 86 | 84 | 84 | 45.4 | 63 | 800 | .427 |
| Control | 2 | 2 | | | | | | | |
| Control | 2 | 3 | | | | | | | |
| Control | 3 | 1 | 86 | 84 | 84 | 45.3 | 67 | 808 | .427 |
| Control | 3 | 2 | | | | | | | |
| Control | 3 | 3 | | | | | | | |

Notes:
Controls: Titleist Tour 100, Tour Edition Miller
Setup for Production: TE with launch angle of about 29.5°, RPM of about 1000, ball speed~, f/s The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

We claim:

1. A non-wound golf ball comprising:

a spherical metal core component having a specific gravity of from about 1.5 to about 19.4;

a core layer disposed about said spherical metal core component, said core layer having a specific gravity less than 1.2, said spherical metal core component and said core layer forming a core assembly, said core assembly having a coefficient of restitution of at least 0.730; and a cover layer assembly disposed about said core layer, said cover layer comprising an ionomeric material and defining a plurality of dimples along an outer surface of said cover layer.

2. The golf ball of claim 1 wherein the diameter of said spherical metal core component ranges from about 0.20 inches to about 0.40 inches.

3. The golf ball of claim 2 wherein the diameter of said spherical metal core component ranges from about 0.3125 inches to about 0.375 inches.

4. The golf ball of claim 1 wherein said spherical metal core component comprises a metal selected from the group consisting of steel, titanium, brass, lead, tungsten, molybdenum, copper, nickel, iron, and combinations thereof.

5. The golf ball of claim 4 wherein said spherical metal core component is a steel selected from the group consisting of carbon steel, stainless steel, chrome steel, and combinations thereof.

6. The golf ball of claim 1 wherein said core assembly has a coefficient of restitution of at least about 0.750.

7. The golf ball of claim 6 wherein said core assembly has a coefficient of restitution of at least 0.780.

8. A non-wound golf ball comprising:

a spherical metal core component; and a core layer concentrically disposed about and immediately adjacent to said spherical metal core component, said core layer comprising polybutadiene, thereby forming a dual core assembly;

wherein said dual core assembly exhibits a coefficient of restitution of at least about 0.780; and a cover layer disposed about said core layer, said cover layer comprising an ionomer resin and defining a plurality of dimples.

9. The golf ball of claim 8 wherein said cover layer comprises:

an inner cover layer disposed about said dual core assembly, said inner cover layer including an ionomeric polymer and said inner cover layer having a Shore D hardness of at least 60; and an outer cover layer disposed about said inner cover layer, said outer cover layer having a Shore D hardness of less than 55 and including an effective amount of an ionomeric polymer.

10. The golf ball of claim 9 wherein the diameter of said spherical metal core component ranges from about 0.20 inches to about 0.40 inches.

11. The golf ball of claim 10 wherein the diameter of said spherical metal core component ranges from about 0.3125 inches to about 0.375 inches.

12. The golf ball of claim 9 wherein said spherical metal core component comprises a metal selected from the group consisting of steel, titanium, brass, lead, tungsten, molybdenum, copper, nickel, iron, and combinations thereof.

13. The golf ball of claim 12 wherein said spherical metal core component is a steel selected from the group consisting of carbon steel, stainless steel, chrome steel, and combinations thereof.

14. The golf ball of claim 9 further comprising at least one mantle layer disposed between said dual core assembly and said inner cover layer.

15. A non-wound golf ball having a dimpled outer surface and exhibiting improved playability properties, said golf ball comprising:

a spherical metal core component having a specific gravity of at least about 1.5;

a core layer disposed about said spherical metal core component and having a specific gravity of less than the specific gravity of said spherical metal core component; and a multi-layer cover assembly disposed about said core layer and including (i) an inner cover layer disposed proximate said core layer, and (ii) an outer cover layer disposed immediately adjacent to said cover layer and defining an outer dimpled surface, wherein at least one of said inner cover layer and said outer cover layer comprises an ionomeric polymer, wherein said spherical metal core component and said core layer constitute a dual core assembly, said dual core assembly exhibiting a coefficient of restitution of at least 0.780.

16. The golf ball of claim 15 wherein said spherical metal core component comprises a metal selected from the group consisting of steel, titanium, brass, lead, tungsten, molybdenum, copper, nickel, iron and combinations thereof.

17. The golf ball of claim 16 wherein said spherical metal core component has a diameter of from about 0.3125 inches to about 0.375 inches.

18. The golf ball of claim 17 wherein said inner cover has a Shore D hardness of at least 60, and said outer cover has a Shore D hardness of less than 55.

* * * * *